United States Patent [19]

Mitomi

[11] Patent Number: 4,675,937
[45] Date of Patent: Jun. 30, 1987

[54] RESILIENT GROMMET WITH METAL LOCK PLATE

[75] Inventor: Seiji Mitomi, Chigasaki, Japan

[73] Assignee: Nifco, Inc., Yokohama, Japan

[21] Appl. No.: 828,207

[22] Filed: Feb. 10, 1986

[30] Foreign Application Priority Data

Feb. 14, 1985 [JP] Japan ............................. 60-18348[U]

[51] Int. Cl.$^4$ ............................................. F16L 5/00
[52] U.S. Cl. .......................................... 16/2; 248/56;
403/194; 403/238
[58] Field of Search ...................... 16/2; 403/194, 197,
403/238, 239; 248/56

[56] References Cited

U.S. PATENT DOCUMENTS

| | | |
|---|---|---|
| 2,897,533 | 8/1959 | Bull et al. ................................... 16/2 |
| 2,912,712 | 11/1959 | Shambam et al. ......................... 16/2 |
| 3,001,007 | 9/1961 | Klumpp, Jr. et al. ................. 16/2 X |
| 3,424,857 | 1/1969 | Miller et al. ............................ 16/2 X |
| 4,407,042 | 10/1983 | Schramme et al. ........................ 16/2 |

FOREIGN PATENT DOCUMENTS 2812510 10/1979 Fed. Rep. of Germany ............ 16/2

Primary Examiner—Fred Silverberg
Attorney, Agent, or Firm—Trexler, Bushnell, Giangiorgi & Blackstone, Ltd.

[57] ABSTRACT

A clip comprises a cylindrical main body with the outer periphery thereof provided with a flange formed adjacent to one open end for restricting the extent of insertion and also with locking protuberances facing the flange, a cylindrical wall extending in the inner space of and integral with the outer cylindrical wall of the main body and defining a gap therewith, a lock plate holder body provided at the other open end of the main cylindrical body and communicating with the inner space thereof, and a washer-like lock plate mounted in the lock plate holder body and having a through-hole and locking pawls projecting from the edge of the through-hole.

2 Claims, 7 Drawing Figures

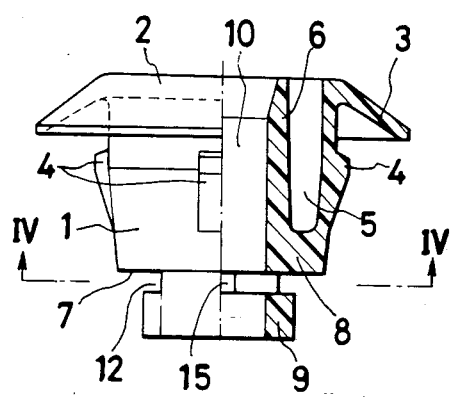
FIG_1
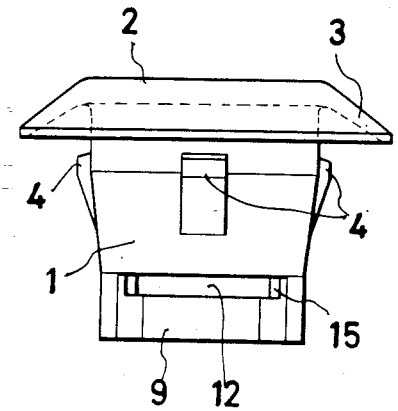
FIG_2
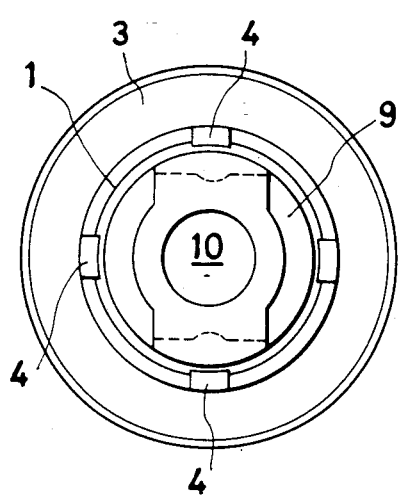
FIG_3
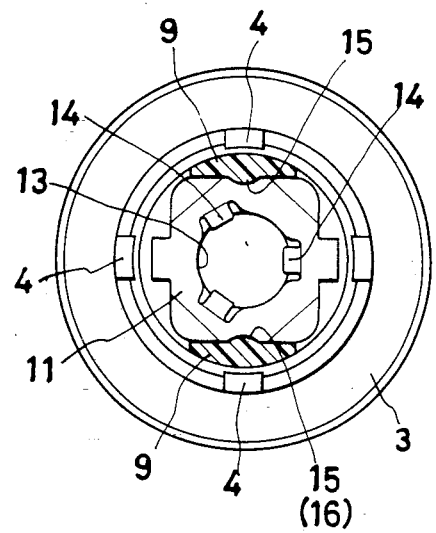
FIG_4

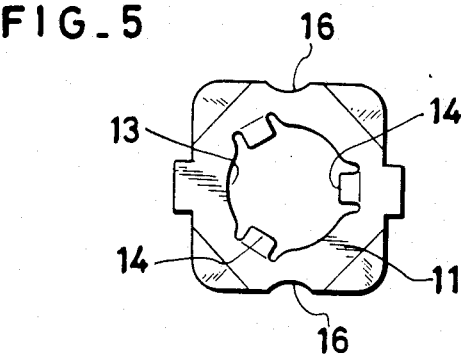
FIG_5
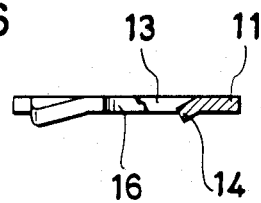
FIG_6
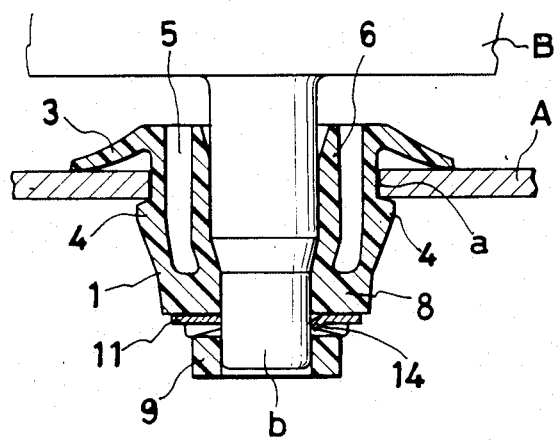
FIG_7

RESILIENT GROMMET WITH METAL LOCK PLATE

FIELD OF THE INVENTION AND RELATED ART STATEMENT

This invention relates to a clip made of a synthetic resin, which is used for simply and reliably mounting a part on a panel by inserting a lock leg of the part through a through-hole formed in the panel.

Ornamental parts, e.g., emblems, are sometimes mounted on the exterior of an automobile or the like using an adhesive. Most usually, however, it is the practice to secure the emblem by, for instance, forming a through-hole in a metal panel of the automobile body and inserting a rod-like lock leg extending from the back side of the emblem through the through-hole.

In this case, a cylindrical mounting clip made of metal, rubber, synthetic resin or other material is used. The clip is mounted in advance in the through-hole or on the lock leg of the emblem. The lock leg to be inserted through the through-hole is thus mounted via the mounting clip.

Of these mounting clips, these made of metal lack versatility in terms of the material. That is, these clips are liable to rattle. Further, where a part is mounted at a plurality of points, it is likely to be difficult to absorb any positional errors between a through-hole and a lock leg, resulting in defective mounting. Further, the water-proof property is inferior. Therefore, rainwater is liable to invade to the interior through the through-hole. In addition, rusting is liable to occur due to scratching of the coating film at the through-hole.

The clips made of rubber or synthetic resins, on the other hand, have versatility. In addition, they can be readily mounted and are superior in water-proof property to metal clips. On the demerit side, however, their locking force is inferior, so that their mounting reliability is inferior.

OBJECT AND SUMMARY OF THE INVENTION

The primary object of this invention is to provide a clip which can be readily mounted in a through-hole formed in a panel and has excellent operability.

Another object of the invention is to provide a highly reliable clip which can perfectly close the through-hole to provide an excellent water-proof effect and also provides a stable locking force.

To attain the above objects of the invention, there is provided a clip which comprises a cylindrical main body with the outer periphery thereof provided with a flange formed adjacent to one open end for restricting the extent of insertion and also with locking protuberances facing the flange, a cylindrical wall extending in the inner space of and integral with the outer cylindrical wall of the main body and defining a gap therewith, a lock plate holder body provided at the other open end of the main cylindrical body and communicating with the inner space thereof, and a washer-like lock plate mounted in the lock plate holder body and having a through-hole and locking pawls projecting from the edge of the through-hole.

With the clip according to the invention, the main portion is constituted by a synthetic resin to make full use of the characteristics of the material for attaining the objects noted above. The main portion is provided with a lock leg holder body into which a lock plate made of metal is assembled. A rod-like lock leg which is inserted into the main body is inserted through the through-hole formed in the lock plate such that it is engaged by locking pawls projecting from the edge of the through-hole. Thus, the clip can be readily mounted in a through-hole formed in a metal panel of a vehicle body. In addition, the lock leg can be readily inserted, and excellent operability can be obtained. Further, when a part such as an emblem is mounted, it perfectly closes the through-hole in co-operation with the lock leg to provide excellent water-proof effect. Further, a stable locking force can be provided.

BRIEF DESCRIPTION OF THE DRAWINGS

The above and other objects and features of the invention will become more apparent from the detailed description with reference to the accompanying drawings, in which:

FIG. 1 is a front view, with the right half in section, showing an embodiment of the clip according to the invention, FIG. 2 is a side view showing the clip shown in FIG. 1, FIG. 3 is a bottom view showing the clip shown in FIG. 1, FIG. 4 is a sectional view taken along line IV—IV in FIG. 1, FIG. 5 is a plan view showing a lock plate of the clip shown in FIG. 1, FIG. 6 is a front view, partly in section, showing part of the lock plate shown in FIG. 5, and FIG. 7 is a sectional view, showing the clip shown in FIG. 1 in use.

DETAILED DESCRIPTION OF THE PREFERRED EMBODIMENT

The drawings illustrate an embodiment of the clip for locking a rod-like lock leg according to the invention, The illustrated clip has a main body 1 which is a synthetic resin molding. The main body 1 has a cylindrical shape of small axial dimension. It has a flange 3 extending from the outer periphery adjacent to one open end 2. The flange 3 has a shape like an umbrella and restricts the extent of insertion of the clip into a through-hole a formed in a panel A to be described later so that the clip is retained in the through-hole. The outer periphery of the main body 1 has a plurality of circumferentially spaced locking protuberances 4. The protuberances 4 are spaced apart from the flange 3 by a distance substantially equal to the thicknese of the panel.

The main body 1 has a coaxial inner cylindrical wall 6 defining a gap 5 with an outer cylindrical wall. The inner and outer cylindrical walls of the main body 1 join together adjacent to the other open end 7 of the main body 1. A lock leg b extending from an emblem B or like part is directly received in a space 10 surrounded by the inner cylindrical wall 6 (as shown in FIG. 7). The thickness of the inner cylindrical wall 6 is appropriately selected to provide suitable flexibility. The inner diameter of the inner cylindrical wall 6 is made equal to or slightly smaller than the outer diameter of the lock leg b, so that the inner cylindrical wall 6 is in close contact with the inserted lock leg b. Reference numeral 9 designates a lock plate holder body which communicates with the space 10 of the inner cylindrical wall 6 through the opening 7 of the main body. Reference numeral 11 designates a washer-like lock plate made of a metal, which is assembled with the lock plate holder body 9.

The lock plate holder body 9 is formed as an extension of the main body 1. In this embodiment, the lock plate holder body 9 has a transversely elongate slot 12 formed in its side wall such that the slot 12 crosses its inner space. As shown in FIG. 5, the lock plate 11 is a substantially square metal plate having a central hole 13 of the same diameter as the inner space of the lock plate holder body 9. It has locking pawls 14 inwardly projecting from the edge of the central hole 13.

When the lock plate 11 is inserted through the slot 12 of the lock plate holder body 9 by producing a strain in its plane, as shown in FIG. 6, it is retained in the lock plate holder body 9 with the central hole 13 coincident with the inner space of the holder body 9 with its upper and lower edges elastically urged against the upper and lower edges of the slot 12.

In this embodiment, the lock plate holder body 9 has projections 15 (FIG. 4) formed on central portions of facing walls of its inner space communicating with the slot 12. The lock plate 11 has notches 16 formed in central portions of its opposite edges. The notches 16 co-operate with the slot 12. That is, when the lock plate 11 is inserted through the slot 12, it is set in a fixed position by engagement of the notches 16 and the projections 15. At this time, the central hole 13 is automatically positioned with respect to the center of the inner space.

To mount the emblem B or like part on the panel A using the clip having the above construction according to the invention, the main body 1 is first inserted from the side of the lock plate holder body 9 through the through-hole a in the panel A. It is inserted with inward flexing of its periphery until the umbrella-like flange 3 strikes the panel surface. At this time, the locking protuberances 4 are click engaged with the edge of the through-hole a.

In this case, the umbrella-like flange 3 is urged against the panel surface to ensure water-tightness. To reliably ensure water-tightness, the diameter of the through-hole a is made slightly smaller than the outer diameter of the main body 1 so that the main body 1 is forcibly mounted by making use of its elasticity.

After the clip has been mounted in the panel in the above way, the lock leg b of the emblem B is inserted into the inner space 10 through the open end 2 on the side of the panel so that its end is inserted into the inner space of the lock plate holder body 9.

The lock leg b which is inserted in this way, expands the inner cylindrical wall 6 accommodated in close contact therewith. The end inserted into the lock plate holder body 9 penetrates the central hole 13 of the lock plate 11 retained in the lock plate holder body 9, and the locking pawls 14 engage the periphery of the leg b.

The lock leg b inserted into the clip thus is held by the inner cylindrical wall 6 and is retained by the lock plate 11 so as to be extremely difficult to take out.

As has been described in the foregoing, the clip according to the invention consists of the main body 1, the inner cylindrical wall 6 and the lock plate holding body 9, these being made of a synthetic resin. Thus, the clip can be readily mounted on the panel. In addition, it has suitable flexibility, therefore, it will not scratch the coating on the wall of the hole and thereby cause rusting. Further, the clip has excellent close contact property and hence has water-proof property which is particularly advantageous for the mounting of automotive parts. Further, with the clip according to the invention, the main body 1 is engaged in the through-hole a in the panel, and the lock leg b is retained by the inner cylindrical wall 6 and the lock plate 11. Further, the gap 5 between the inner cylindrical wall 6 and the outer cylindrical wall of the main body serves to absorb the relative displacement between the panel A and the lock leg b. Therefore, sufficient close contact can be obtained to make the water-proof effect more reliable.

Further, with the clip according to the invention the main body and the inner cylindrical wall are elastically connected via a connecting portion 8 and are made of an elastic synthetic resin. Thus, where a plurality of lock legs are used to mount a part, it is possible to absorb any positional error between the through-hole and the lock leg. Further, since the inner cylindrical wall is elastically connected to the main body through the connecting portion, if the lock leg has a slight inclination, the inner cylindrical wall can be deformed in conformity with the inclination, thereby making it possible to reduce inferior mounting of the lock leg to a great extent.

Further, with the clip according to the invention, the mounting of a part on the panel is completed by merely inserting the lock leg of the part, which is very advantageous from the standpoint of operability. Further, the clip has the lock plate 11 with the locking pawls 14 projecting from the edge of the central hole 13 engaging the periphery of the lock leg, thus ensuring reliable mounting.

All of the clip according to the invention except for the lock plate is made of a synthetic resin so that it can be readily mass produced.

In the above embodiment the lock plate 11 is inserted through the slot 12 in the lock plate holder body 9. However, it is also possible to mold a lock plate in place together with the rest of the clip body. The main body and the inner cylindrical wall correspond in shape to the through-hole of the panel and the lock leg respectively. Where the through-hole or lock leg are circular, the outer shape of the main body and inner shape of the inner cylindrical wall may be selected in conformity with the shape of the through-hole and the lock leg.

What is claimed is:

1. A plastic clip for mounting a rod-like lock leg of a part penetrating a through-hole formed in a panel, comprising;

a cylindrical main body having a flange formed adjacent to one open end and a plurality of locking protuberances formed on the outer periphery so as to face said flange at a predetermined distance therefrom said main body having an inner and an outer cylindrical wall;

said inner cylindrical wall being provided in an inner space of said main body and defining a gap with the outer cylindrical wall of said main body, said inner cylindrical wall defining a first central hole having an axis and being joined to said outer cylindrical wall of said main body adjacent to the other open end thereof;

a lock plate holder body being provided at said other open end and being spaced from said main body by a slot with upper lower and side portions, said side portions being connected to said main body and said lock plate, said body having a second central hold with an axis coaxial with the axis of the first central hole that communicates with the inner space defined by said inner cylindrical wall; wherein the diameter of the inner space defined by said inner cylindrical wall is smaller than the outer diameter of said lock leg; and a separate sheet metal lock plate mounted in said slot and having a through-hole with an axis and with adjacent edge portions adapted bitingly to engage a lock leg inserted through said first and second central holes, wherein said plate includes means to resiliently engage the upper and lower portions of the slot as said plate is inserted into said slots, said plate also includes side detent means located on edges of said plate, said side detent means cooperating with side detent means located on the side portions of the slot to locate the axis of the through-hole of the lock plate so as to be coaxial with said axis of said first and second central holes.

2. The clip according to claim 1, wherein said lock plate has locking pawls inwardly projecting from the edge of said through-hole.

* * * * *